US009283505B1

(12) United States Patent
Rossnagel

(10) Patent No.: US 9,283,505 B1
(45) Date of Patent: Mar. 15, 2016

(54) CIRCULAR AIR FILTER SUITABLE FOR FILTERING CONTAMINANT-CONTAINING AIR

(71) Applicant: Bryan Rossnagel, Houston, TX (US)

(72) Inventor: Bryan Rossnagel, Houston, TX (US)

(73) Assignee: Bryan Rossnagel, Houston, TX (US)

( * ) Notice: Subject to any disclaimer, the term of this patent is extended or adjusted under 35 U.S.C. 154(b) by 0 days.

(21) Appl. No.: 13/791,029

(22) Filed: Mar. 8, 2013

(51) Int. Cl.
*B01D 46/00* (2006.01)
*B01D 46/24* (2006.01)
*B01D 46/42* (2006.01)
*B01D 46/48* (2006.01)

(52) U.S. Cl.
CPC ............ *B01D 46/2414* (2013.01); *B01D 46/42* (2013.01); *B01D 46/4227* (2013.01); *B01D 46/48* (2013.01)

(58) Field of Classification Search
CPC ............... B01D 46/0057–46/08; B01D 46/00; B01D 46/2414; B01D 46/42; B01D 46/4227; B01D 46/48
USPC .................................... 55/282–305, 490–519
See application file for complete search history.

(56) References Cited

U.S. PATENT DOCUMENTS

| 3,308,610 | A | * | 3/1967 | Springer ................ A01G 15/00 55/471 |
| 3,850,598 | A | * | 11/1974 | Boehm ............................. 96/60 |
| 4,227,902 | A | * | 10/1980 | Olson ............................. 55/302 |
| 4,467,494 | A | * | 8/1984 | Jones ................... A47L 9/1418 15/352 |
| 4,536,200 | A | | 8/1985 | Reist |
| 4,629,482 | A | * | 12/1986 | Davis ............................ 55/385.2 |
| 4,786,293 | A | | 11/1988 | Labadie |
| 4,818,261 | A | | 4/1989 | Beckon |
| 5,125,939 | A | * | 6/1992 | Karlsson ................. A47L 9/127 454/65 |
| 5,147,427 | A | | 9/1992 | Abbot et al. |
| 5,188,644 | A | * | 2/1993 | Landy ............................. 95/268 |
| 5,358,443 | A | * | 10/1994 | Mitchell et al. ............... 454/230 |
| 5,395,409 | A | | 3/1995 | Klimczak et al. |
| 5,399,319 | A | * | 3/1995 | Schoenberger et al. ......... 96/224 |
| 5,410,120 | A | * | 4/1995 | Taylor ............................. 219/72 |
| 5,612,001 | A | * | 3/1997 | Matschke ........................ 96/224 |
| 5,641,343 | A | * | 6/1997 | Frey ................................ 96/135 |
| 5,843,197 | A | | 12/1998 | Rossnagel |
| 6,197,096 | B1 | * | 3/2001 | Cartellone ........................ 96/55 |
| 6,358,292 | B1 | * | 3/2002 | Clements ........................ 55/498 |
| 6,758,874 | B1 | * | 7/2004 | Hunter, Jr. ...................... 55/337 |
| 6,783,578 | B2 | * | 8/2004 | Tillman, Jr. ..................... 96/224 |
| 6,834,412 | B2 | * | 12/2004 | Stanovich et al. ............ 15/327.2 |
| 8,460,417 | B2 | * | 6/2013 | Reid et al. ....................... 55/356 |
| 8,523,970 | B2 | * | 9/2013 | Lakdawala et al. ............. 55/467 |
| 2004/0112221 | A1 | * | 6/2004 | Tillman, Jr. ..................... 96/226 |
| 2004/0261376 | A1 | | 12/2004 | Morgan et al. |
| 2006/0260282 | A1 | * | 11/2006 | Peng .............................. 55/356 |
| 2009/0114095 | A1 | | 5/2009 | Hanson et al. |
| 2011/0072770 | A1 | * | 3/2011 | Lakdawala et al. ............. 55/358 |

\* cited by examiner

*Primary Examiner* — Thomas Bennett McKenzie

(57) ABSTRACT

An apparatus for filtering contaminant-containing air has a base, an air filter positioned upon the base, a plate affixed over an end of the filter opposite the base, and a motor or fan suitable for drawing the contaminant-containing air through the inlet of the plate and into the interior volume of the air filter. The air filter has a generally annular cross-section. The air filter has an interior volume suitable for receiving the contaminant-containing air therein. A screen can be affixed over the exterior surface of the air filter. The air filter will have a structural integrity suitable for supporting the plate thereon.

1 Claim, 2 Drawing Sheets

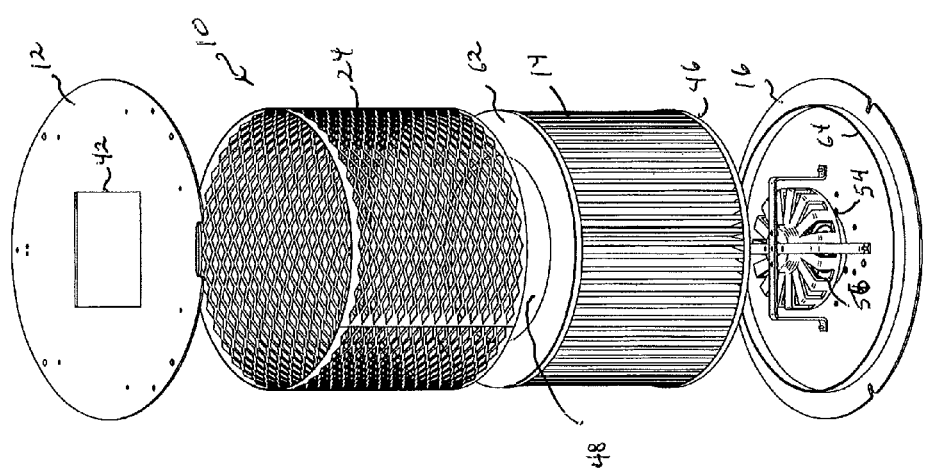

CIRCULAR AIR FILTER SUITABLE FOR FILTERING CONTAMINANT-CONTAINING AIR

CROSS-REFERENCE TO RELATED APPLICATIONS

The present application is a continuation-in-part of U.S. application Ser. No. 13/463,347, filed on May 3, 2012, and entitled "Process and Apparatus for Cleaning Particulate-Laden Air and for Cleaning Particles from a Filter", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to air filters. More particularly, the present invention relates to air filtering system that are used in industrial operations. The present invention also relates to air filter in which particulate-laden air and/or noxious air is received within the interior of an air filter.

2. Description of Related Art Including Information Disclosed Under 37 CFR 1.97 and 37 CFR 1.98

Manufacturing processes often generate nauseous and fumes during processing. These fumes are typically unwanted but inherent by-products of the manufacturing process. For example, solvent fumes are typically emitted from baths used for metal parts. The manufacturing of electrical components and electronic circuit boards often creates noxious fumes which arise from the soldering activities of attaching and detaching electrical components in devices such as relays, power supplies, and electronic components to circuit boards. The fumes generated by soldering or desoldering of electrical/electronic components are, at the very least, an irritation to the worker. High concentrations of these fumes may cause illness. Government regulations require removal and venting of the fumes to protect workers.

Particulate-laden air and noxious fumes is generated in a variety of processes. These processes can include soldering, welding, grinding, pharmaceutical powders, and food processing. It is desirable to remove the particulate-laden air or noxious by drawing the air from the area of the particular operation to a remote location. The particles are desirably filtered from the particulate-laden air by using a filtering apparatus.

Devices have been provided for the removal of particles from the particulate-laden air from the workplace. One device uses a vacuum to extract the particulate-laden air from soldering work areas and to pass the particulate-laden air through a filter. The particulate-laden air filter includes a pleated pre-filter for the removal of large particles, a HEPA filter for removing particles down to 0.3 microns, and an activated charcoal filter for removal of volatile components and odors in the particulate-laden air. The vacuum and filter device connects through hoses to articulatable arms that mount adjacent to the work stations. The arms comprise pivotally interconnected tubes with nozzles attached to distal ends. The nozzles are typically elongated tubes having a slit for communicating the air to the filter, although cylindrical nozzles and funnel nozzles are known. The worker that is soldering electronic components moves the articulatable arm to position the nozzle within a proximal area of the solder work. The vacuum apparatus induces a suction through the nozzle for pulling the soldering fumes in the general area of the nozzle into the tube and into the filter apparatus.

Other particulate-laden air removal devices attach a suction nozzle to the soldering iron adjacent to the heating tip. The inlet of the vacuum device is thereby positioned adjacent to the primary source of the solder fumes.

The present inventor is the owner of U.S. Pat. No. 5,843,197, issued on Dec. 1, 1998, for a particulate removal apparatus for use in soldering operations. This patent describes a particulate removal apparatus that has a housing with an inlet opening formed therein and an interior cavity, a filter positioned within the housing for removing particles from air passing therethrough, an impeller positioned within the interior cavity of the housing, and a motor positioned within the interior cavity of the housing and positioned between the impeller and the filter. The impeller has backward-inclined impeller blades. The impeller pulls air through the inlet opening and directs the air toward a wall of the interior cavity. The impeller blades generally surround the interior opening. The filter is a HEPA filter positioned within a framework within the housing. The HEPA filter is arranged in an accordion-style folded configuration within the framework.

It is very important to use the filter so as to remove the particles from the particulate-laden air. Typically, these particles will be embedded within a filter structure. When a significant amount of particles have accumulated within the filter structure, it is necessary to remove and/or clean the filter so that the optimum filtering capacity is achieved. The replacement of the filters often requires a significant amount of downtime and complex cleaning operations. In those circumstances where the filter must be entirely replaced, then the continued replacement of the filters presents a significant cost associated with the particular manufacturing operation.

In the past, reverse pulse cartridge filters have been utilized for the purposes of removing particles from particulate-laden air. Typically these reverse pulse cartridge filters place a filter in a hollow cylinder. An air pipe is in the middle. Compressed air is directed from the interior of the pipe outwardly so as to cause the particles on the exterior of the filter to be discharged within the housing. As such, the discharged particles are removed from the bottom of the filter housing. The particles are blown by a pneumatic pulse from the inside of the filter toward the outside of the filter. Typically, a fixed tubular member is placed within the interior of the filter so as to direct bursts of air in a fixed pattern toward the interior surface of the filter. This type of reverse pulse cartridge filter requires a relatively complex arrangement of solenoids, diaphragms and electronic controls. The system is timed so that after a predetermined period of time, the pulse is directed toward the interior surface of the filter. The continued directing of this pulse toward a specific surface of the filter can cause a deterioration in the fibrous structure of the filter. As such, replacement will be necessary as the filter deteriorates.

In the past, various patents have issued relating to such reverse pulse cartridge filters. For example, U.S. Pat. No.

4,536,200, issued on Aug. 20, 1985 to P. C. Reist, describes a gas filter apparatus and method that utilizes cylindrical pleated paper filters arranged to collect particulates on the interior of the filters from scavenging gas flowed through the filters. The particulates are removed by applying a high pressure gas pulse to an air chamber in a cylindrical housing surrounding each filter in spaced relation which forces the removed particulates axially through an open end of the filter.

U.S. Pat. No. 4,786,293, issued on Nov. 22, 1988 to P. A. Labadie, shows a smart controller for reverse pulse air filters. This control device applies a pressure differential across the air filter. This pressure differential is continuously monitored and compared to a reference set point pressure differential. When the pressure differential across the air filter is greater than or equal to the reference set point pressure differential, a cleaning cycle is initiated. At the end of the cleaning cycle, a new pressure differential across the air filter is measured and compared to the pressure differential before cleaning. If the new pressure differential is lower, it is stored and another cleaning cycle is initiated. This cycle is repeated until the "after" pressure differential is equal to or greater than the "pre-cleaning" pressure differential. At this point, a new reference set point pressure differential is calculated and the initial monitoring cycle is repeated until the pressure differential across the filter becomes equal to or greater than the new reference set point.

U.S. Pat. No. 4,818,261, issued on Apr. 4, 1989 to W. E. Beckon, describes an improved air filter for use in a filtering system which uses reverse air pulse cleaning of a filter medium which is surrounded by and connected in sealed relation to an exterior housing. An energy absorption means is incorporated within the housing in such a manner as to prevent the direct flow of the reverse air pulses during cleaning from directly contacting the seal between the filter medium and the housing. Thereby, the air flow is redirected through the filter medium before reaching the seal.

U.S. Pat. No. 5,147,427, issued on Sep. 15, 1992 to Abbot et al., shows an air filtration system that reduces positive and/or negative resistance by eliminating duct work to and from the to-be-filtered room. The air filtering system forms a common wall with the to-be-filtered room permitting dirty air to move easily and quickly through to the cleaning process. Through the use of vertical baffles and reverse pulsed jets, debris is easily and efficiently collected in drawers or trays.

U.S. Pat. No. 5,395,409, issued on Mar. 7, 1995 to Klimczak et al., discloses a dust collecting apparatus having reverse pulse filter cleaning capability. A plurality of elongated filter elements are periodically cleaned by a reverse pulse cleaning system which directs a reverse pulse of air through the open end of each filter element so as to remove contaminants which have collected on its external surface. The reverse pulse cleaning system has an air delivery pipe above each of the filter elements. Each air delivery pipe includes an air delivery nozzle assembly which includes at least one pair of transverse pipe sections which are transversely aligned and extend in opposite directions from the air delivery pipe so as to define a cross-like configuration. A plurality of apertures are disposed in a linear line along the air delivery pipe. At least one aperture is disposed in each of the transverse pipe sections. By this arrangement, the cross-sectional configuration of the reverse pulse of air entering into the top of each filter element may be predetermined so as to ensure that the pulse properly impacts the interior of the filter element and effectively removes the collected contaminants.

U.S. Patent Publication No. 2004/0261376, published on Dec. 30, 2004 to Morgan et al., teaches a pleated air filter with reverse pulsating air flow cleaning. This air filter assembly has a pleated filter cartridge for filtering out dust from the air. The cartridge is in the form of a receptacle having an open top, a closed bottom and closed sides which run entirely therearound. Pleats are formed in the sides of the cartridge. The pleats are separated from each other by an adhesive bead which may be formed from a hot melt material. In the filtering cycle, air is drawn out by a blower from the inside of the cartridge thereby drawing air from the outsides through the pleated sides which so as to filter out particles. The filtered air is fed from the cartridge to an area requiring clean air. Periodically, the filter is automatically cleaned by compressed pulsating air which is fed to the interior of the cartridge through the pleated sides so as to blow off dirt accumulated on the cartridge.

U.S. Patent Publication No. 2009/0114095, published on May 7, 2009 to Hanson et al., shows a filter cleaning system and method. This filter cleaning system has a baghouse including a tubesheet having a plurality of openings extending therethrough. A plurality of filter cartridges are sealingly mounted to the tubesheet at respective openings. Each filter cartridge has an open end and pleated media for filtering particulates from gas flowing therethrough. The filter cartridge has particulates accumulating on the pleated media. A pulse cleaning system intermittently directs cleaning pulses of air into the open ends of the filter cartridges media at a supply pressure in the range of about 20 p.s.i. to 60 p.s.i. to dislodge accumulated particulates from the pleated media.

It is an object of the present invention to provide an air filtering apparatus that effectively removes particles, odors and irritants from particulate-laden air.

It is another object of the present invention to provide an air filtering system whereby the filters can be quickly cleaned.

It is another object of the present invention to provide an air filtering apparatus which avoids the need for a chassis for the air filter.

It is another object of the present invention to provide an air filtering apparatus which has a minimal footprint and avoids wasted space.

It is another object of the present invention to provide an air filtering apparatus which enhances the flow of air on the interior of the filter so as to enhance the ability of particles within the air to be entrapped in the air filter.

It is another object of the present invention to provide an air filtering apparatus which minimizes the number of components that are used for the filtering of the air.

It is still a further object of the present invention to provide an air filtering apparatus that reduces the costs associated with the filters and the items used for cleaning the filters.

These and other objects and advantages of the present invention will become apparent from a reading of the attached specification and appended claims.

BRIEF SUMMARY OF THE INVENTION

The present invention is an apparatus for filtering air which comprises a base, an air filter positioned upon the base, a plate affixed over an end of the filter opposite the base, and a means for drawing contaminant-containing air through an inlet of the plate and into the interior volume of the air filter. The air filter has an exterior surface and an interior surface. The air filter has a generally circular cross-section. The plate has the opening which opens to the interior volume of the air filter.

In the present invention, a screen can be affixed over the exterior surface of the air filter. This screen has a circular cross-section and extends from the base to the plate. This air filter can be formed of a fibrous material and/or a carbon filter.

The means for drawing the contaminant-containing air is a motor (or fan) affixed to the plate and cooperative with the inlet so as to draw the contaminant-containing air through the inlet and into the interior volume of the air filter. A duct is affixed over the inlet and extends outwardly of the plate. The duct has a nozzle at an end thereof opposite the inlet of the plate. The duct is adjustable to a desired orientation. The motor (or fan) serves to draw the contaminant-containing air through the nozzle and through the duct and eventually into the interior volume the air filter. The interior surface of the air filter directly faces the interior volume of the air filter and is uncovered by any structure.

The base has a diameter greater than a diameter of the air filter. The plate also has a diameter greater than the diameter of the air filter. At least one support rod is affixed at one end to the base and at an opposite end of the plate. In particular, the plate has a plurality of holes formed therethrough. The support rod includes a plurality of support rods in which each has a threaded end extending through the hole in the plate. A plurality of knobs are respectively threadedly affixed to the threaded ends of the plurality of support rods so as to affix the plate upon the air filter. The plurality of support rods are positioned outwardly of and adjacent to the exterior surface of the air filter.

A handle is affixed to the plate and extends outwardly therefrom. The handle has a pair of rods extending vertically upwardly from the plate. The handle includes a gripping portion extending between ends of the pair of rods opposite the plate. The gripping portion extends outwardly of the pair of rods in a generally horizontal plane.

The base has an opening formed therein. This opening is positioned so as to communicate with the interior volume of the air filter. A tray is removably affixed to the base and underlies the opening of the base. The tray is suitable for receiving particles for the air therein. A plurality of casters are rotatably mounted to a bottom of the base and extend downwardly therefrom. The plurality of casters are suitable for rolling on an underlying surface.

The foregoing section is intended to describe, in generality, the preferred embodiment of the present invention. It is understood that variations in the preferred embodiment of the present invention can be made within the scope of the present invention. As such, this section should not be construed as limiting of the scope of the present invention. The present invention should only be limited by the following claims and their legal equivalents.

BRIEF DESCRIPTION OF THE SEVERAL
VIEWS OF THE DRAWINGS

FIG. 3 is an upside-down exploded view of the air filter apparatus of the present invention.

DETAILED DESCRIPTION OF THE INVENTION

Figure 1:
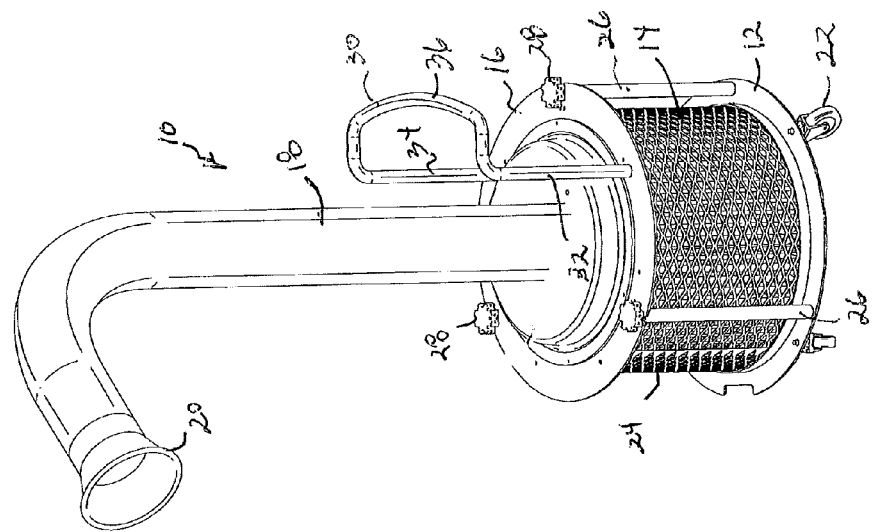
FIG. 1 is a perspective view of the assembled air filtering apparatus in accordance with the preferred embodiment of the present invention.

Referring to FIG. 1, there is shown the air filter apparatus 10 in accordance with the preferred embodiment of the present invention. The air filter apparatus 10 includes a base 12, an air filter 14 positioned upon the base 12, and a plate 16 positioned over an end of the air filter 14 opposite the base 12. As will be described hereinafter, there is a suitable means for drawing particulate-laden and/or noxious air through and inlet of the plate 16 and into the interior volume of the air filter 14.

In FIG. 1, there is shown a duct 18 that extends outwardly and upwardly from the plate 16. The duct 18 is suitably flexible so that it can be oriented to a desired orientation. A nozzle 20 is positioned at the end of the duct 18 opposite the plate 16. The duct 18 can incorporate a polycarbonate support rod therein so as to facilitate the adjustment of the flexible duct 18.

As can be seen in FIG. 1, the base 12 has a generally disc-like circular shape. The plate 16 has an outer diameter greater than the outer diameter of the air filter 14. The plate 16 is in the nature of a generally flat plate which will have an opening formed therein so as to communicate with the interior volume of the air filter 14. A plurality of casters 22 are rotatably mounted to the bottom of the plate so as to extend downwardly therefrom. The casters 22 facilitate the ability of the air filter apparatus 10 to move along an underlying surface.

The air filter 14 has a generally annular cross-section. A screen 24 is affixed over the exterior surface of the air filter 14. In the preferred embodiment of the present invention, the screen 24 has a web-like structure with suitable openings formed therein. The air filter 14 is formed of a fibrous material. In normal use, the air filter 14 can have microfibers extending toward the interior volume thereof. As such, any particles from particulate-laden air that are received within the interior volume of the air filter 14 will generally reside loosely upon the microfibers and will not deeply enter the fibrous structure of the air filter 14. Since the particles are loosely retained by microfibers, they can be easily discharged when pressurized air is applied to the outer surface of the air filter 14. Since a substantial amount of the particles are retained by the microfibers of the filter, the air filter 14 can be quickly cleaned through the use of the pressurized air. It should be noted that a wide variety of other types of filter constructions can be made within the scope of the present invention.

The air filter 14 should have a suitable structural integrity so as to maintain its structural configuration when placed upon the base 12. Additionally, the air filter 14 can have suitable structural integrity so as to generally support the plate 16 thereupon.

Alternatively, or in addition, the air filter can be a carbon or charcoal filter. The carbon filter can adsorb odors and irritants from the drawn-in air. The carbon or charcoal filter can be pleated or have a honeycomb structure. The carbon filter adsorbs volatile chemicals or a molecular basis. It can serve to change the contaminants from a gaseous phase to a solid phase.

The circular construction of the air filter 14 achieves a significant number of advantages. Fundamentally, this annular shape provides a strong structural integrity for the air filter 14. There is no need for a separate chassis to retain the air filter 14 therein. As such, the air filter 14 will not waste space. Since the interior volume of the air filter 14 is of a circular cross-section, there are no corners within the interior volume. It has been found that square corners, in the nature of square box-shaped filter constructions, will create vortices and dead air volumes. As such, these corners would tend to fight against the proper flow of air. Under these circumstances, the flow of air would get trapped in these corners so that it is not possible to achieve a proper flow of air within the interior volume of the air filter. The annular cross-section of the air filter 14 provides a greater surface area of filter per square foot of floor space. As such, this could serve to minimize the footprint of the air filter apparatus 10 of the present invention.

The plate 16 is placed upon the top of the air filter 14. The plate 16 is also of a circular construction and has an outer diameter greater then the outer diameter of the air filter 14. A plurality of support rods 26 will extend from the base 12 to the plate 16. As shown in FIG. 1, a total of three support rods 26 are illustrated. Each of the support rod 26 will have a threaded end which emerges above a top surface of the plate 16. A plurality of knobs 28 are threadedly affixed over the threaded ends of the support rod 26 which extend above the plate 16. As such, the knobs 28 can be used so as to properly secure the plate 16 to the support rod 26 and upon the top of the air filter 14. When it is required to replace the air filter 14, the knobs 28 can be suitably loosened so that the plate 16 can be separated from support rods 26 and such that access to the air filter 14 can be obtained. The plate 16 will have a plurality of holes formed therein through which the threaded ends of the support rods 26 extend. In normal use, the knobs 28 will bear against the top of the surface plate 16 so as to properly secure the plate 16 in position.

A handle 30 is affixed to the plate 16 and extends upwardly therefrom. The handle 30 has a unique construction. The handle 30 has a first rod 32 and a second rod 34 in which each has one end affixed to the top surface of the plate 16. A gripping portion 36 is affixed to the opposite ends of the rods 32 and 34 and extends outwardly therefrom in a generally horizontal plane. It can be seen that the handle 30 extends entirely within the perimeter defined by the top plate 16. As such, the gripping portion 36 of the handle 30 will not extend beyond the footprint of the air filter apparatus 10. The arrangement of the rods 32 and 34 and the gripping portion 36 facilitates the ability to easily manipulate the air filtering apparatus and to move the air filter apparatus 10 to a desired location. The position of the handle 30 will avoid interference or contact with adjacent tables, machinery, or other appliances.

In normal use, the air filter apparatus 10 can be easily moved by gripping the gripping portion 36 and applying a suitable force to the handle 30. The duct 18 can then be manipulated such that the nozzle 20 extends to the welding, soldering, or other particle-generating or noxious fume-generating operation. The motor (to be described hereinafter) can then be activated so that air is drawn through the opening of the nozzle 20 and directed to the interior of the duct 18 and into the interior of the air filter 14.

Figure 2:
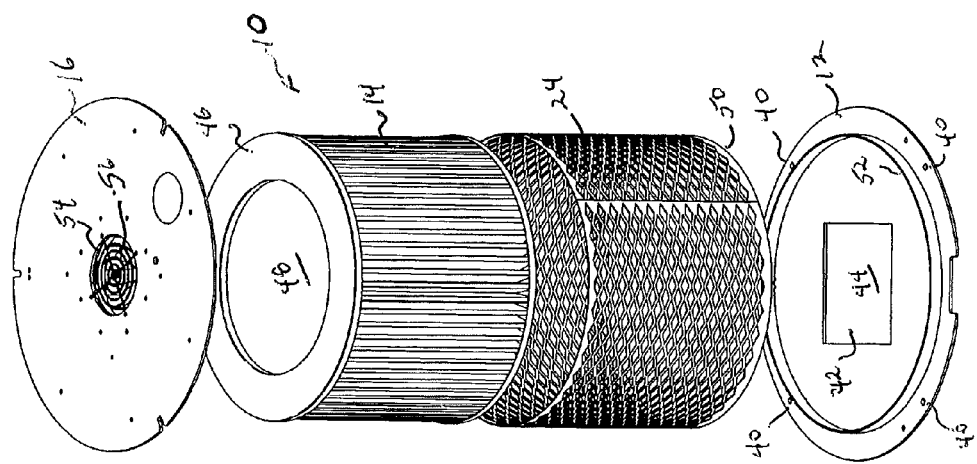
FIG. 2 is a exploded view of the air filter apparatus in accordance with the teachings of the present invention.

FIG. 2 shows an exploded view of the air filter apparatus 10 of the present invention. In FIG. 2, it can be seen that the base 12 has a plurality of holes 40 formed therethrough. Holes 40 can be utilized so as to receive the ends of the rods 26, or alternatively, the holes 40 can receive the casters 26 therein. The plate 20 has an opening 42 formed generally centrally thereof. Opening 42 will communicate with the interior volume of the air filter 14 so as to allow particles to pass therethrough. A suitable tray 44 can be removably placed at the bottom of the opening 42. Tray 44 can receive the particles therein. When a sufficient amount of particles are received within the tray 44, the tray 44 can be removed from the bottom of the plate 12. An empty tray 44 can then be placed over the opening 42 so as to continue to receive the particles therein.

FIG. 2 illustrates the air filter 14. The air filter 14 is of a pleated fibrous-type material. The air filter 14 has a top surface 46 formed thereon. The top surface 46 has an opening which opens to the interior volume 48 of the air filter 14. The air filter 14 will have an interior surface which faces the interior volume 44 and which is not obstructed by any other covering or structure. As such, the interior surface of the air filter 14 will be unimpeded by any structures. As such, a maximum surface of the air filter is interacted with the particles that are received within the interior volume 14.

The screen 24 is of a an annular cross-section. The air filter 14 is received within the interior of the screen 24. The screen 24 will have a bottom end 50 which can be placed upon the top surface of the base 12. The base 12 includes a rim 52 extending upwardly therefrom. Rim 52 will generally cover a small portion of the exterior of the screen 24 adjacent the bottom 50. Similarly, the rim 52 will overlie the lower portion of the air filter 14 at the bottom thereof. As such, the rim 52 assures the proper centering of both the screen 24 and the air filter 14 upon the base 12.

The plate 16 has a central opening 54 formed therein. A motor (or fan) 56 is placed at the central inlet 54 so as to draw the air therethrough the inlet 54 and into the interior volume 48 of the air filter 14. The plate 16 includes suitable holes for the receipt of the threaded ends of the rods 26 and also for the receipt of the rods 32 and 34 of the handle 30 and also for the receipt of the housing 60 at the end of the duct 18. As such, the plate 16 facilitates the assembly of the air filter apparatus 10 of the present invention.

FIG. 3 shows an upside-down view of the air filter apparatus 10 of the present invention. In particular, the base 12 is illustrated in an uppermost position. The opening 42 of the base 12 is illustrated as having a generally square configuration. As such, a suitable square-shaped tray can be placed thereunder. The screen 24 is illustrated suitably receiving the air filter 14 therein. The plate 16 will underlie both the screen 24 and the air filter 14. The air filter 14 has a bottom surface 62 which will bear against the surface of the base 12.

The plate 16 is also illustrated as being of a circular construction. The base 12 includes a rim 64 which has an annular shape and will extend downwardly therefrom. Rim 64 will serve to receive the upper end of the screen 24 therein and also the upper end 46 of the filter 14 therein. As such, rim 64 facilitates the proper and accurate centering of the air filter 14 and the screen 24 within the interior of the plate 16.

The motor 56 is illustrated as extending over the inlet 54 of the plate 16. The motor 56 can be in the nature of an impeller-type motor or fan which creates a suitable suction so as to draw particulate-laden air through the inlet 54 and into the interior volume 48 of the air filter 14.

In normal use, the motor 56 is in the nature of fan which serves to direct the air into the interior volume 48 of the filter 14. As the air is directed into the interior volume 48, the negative pressure at the inlet 54 is converted to a positive pressure within the interior volume 48. As such, any particles from the air will migrate and reside on the interior surface of the air filter 14. The motor 56 will continue to draw the air into the interior volume 48 until the interior surface of the air filter 14 becomes suitably covered with the particles. At this time, a reduction in the suction or vacuum force generated by the motor 56 can be noted by suitable gauges. The motor 56 can then be turned off so that no further suction occurs.

In order to discharge the particles from the inner surface of the filter 14, a source of pneumatic pressure, such as an air blower, is directed toward the exterior surface of the air filter 14. The force of this compressed air will cause the particles that had been residing on the interior surface of the air filter 14 to be released therefrom and fall toward the base 12. The source of pneumatic pressure can be directed generally over the entire exterior surface of the air filter 14 so as to completely remove particles from the interior surface of the air filter 14. As a result, the particles that had been residing on the interior surface of the air filter 14 will be completely removed such that the filters are cleaned. At this time, the motor 56 can be energized so that further suction can be carried out in the area of the particle-generating operation.

The present invention provides a quick and easy technique for the cleaning the air filter 14. All that is necessary is a source of compressed air. A source of compressed air is easily available in most manufacturing locations. There is no need for piping, valves, diaphragms and other electronic control equipment so as to effectively achieve the periodic cleaning of the air filter 14. Whenever a reduction of suction or vacuum pressure is noted, the worker can easily stop the suction or vacuum and clean the filter 14. As a result, the air filter 14 can be used over an extended period of time without need for replacement, repair or maintenance. Since pressurized air is applied generally evenly over substantially the entire exterior surface of the air filter 14, there is no potential of damage by repeated application of compressed air onto specific locations of the filter. As a result, the loosening of the fibrous structure of the air filter 14 is extended over a longer period of time than that of the prior art. No special skill or training is required in order to effectively clean the air filter 14. As such, the filtering apparatus 10 can be relatively inexpensive and cost-effective.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A filtering apparatus comprising:
   a base comprising an upper portion, a lower portion, and an opening formed therein extending from the upper portion to the lower portion;
   a rim attached to the upper portion of the base, the rim comprising an inner surface and an outer surface wherein the rim extends from the upper portion of the base toward an upper end of the apparatus;
   a screen comprising a top end, a bottom end and a tubular body extending from the top end to the bottom end, the tubular body of the screen forming an exterior surface and an interior surface, wherein the interior surface of the screen forms a hollow interior, the screen further comprising a web-like structure with openings formed therein, wherein the openings extend from the interior surface to the exterior surface, wherein the bottom end of the screen is positioned upon the upper portion of the base such that the bottom end of the screen lies within the inner surface of the rim;
   an air filter comprising a top, a bottom and a tubular body formed of a pleated fibrous material extending from the top to the bottom of the air filter, the tubular body of the air filter forming an exterior surface and an interior surface, wherein the interior surface of the air filter forms an interior volume, wherein the top of the air filter forms an opening which opens to the interior volume of the air filter and wherein the bottom of the air filter forms an opening which opens to the interior volume of the air filter, wherein the air filter is positioned within the hollow interior of the screen such that the bottom of the air filter is positioned upon the upper portion of the base, the opening of the base positioned so as to communicate with interior volume of the air filter, wherein the interior surface of the air filter is exposed directly to the interior volume;
   a plate comprising a top surface and a bottom surface wherein the bottom surface of the plate is placed upon the top of the air filter and upon the top end of the screen, the plate comprising an inlet opening extending from the top surface to the bottom surface, wherein the inlet opening opens to the interior volume of the air filter;
   a motor placed within the inlet opening of the plate;
   a duct directly attached to and extending from the top surface of the plate, the duct comprising a first end and a second end wherein the first end is attached to the top surface of the plate while the second end comprises a nozzle attached thereto;
   a tray removably affixed to the lower portion of the base and underlying the opening of the base;
   a plurality of casters directly mounted to the lower portion of the base; and
   a plurality of support elements positioned around the exterior surface of the screen, each support element comprising a top end and a bottom end, wherein each support element extends from the base to the plate such that the bottom end of each support element is attached to the upper portion of the base while the top end of each support element is attached to the bottom surface of the plate;
   during operation, the motor operates to draw contaminated air through the nozzle, into the duct, into the inlet opening of the plate and into the interior volume of the air filter, such that the contaminated air is purified as it moves through the air filter from the interior surface to the exterior surface of the air filter, the purified air being expelled directly to an ambient air environment through the openings of the web-like structure of the screen.

* * * * *